United States Patent
Nickels et al.

(10) Patent No.: US 8,057,750 B2
(45) Date of Patent: Nov. 15, 2011

(54) HIGH PURITY MAGNETITE FORMATION PROCESS AND APPARATUS, AND PRODUCT THEREOF

(75) Inventors: Dale L. Nickels, Beaver Falls, PA (US); Thomas E. Weyand, New Brighton, PA (US); Michael E. Sawayda, McKees Rocks, PA (US)

(73) Assignee: Pittsburgh Iron Oxide, LLC, New Brighton, PA (US)

( * ) Notice: Subject to any disclaimer, the term of this patent is extended or adjusted under 35 U.S.C. 154(b) by 91 days.

(21) Appl. No.: 12/696,711

(22) Filed: Jan. 29, 2010

(65) Prior Publication Data
US 2010/0129264 A1    May 27, 2010

Related U.S. Application Data

(62) Division of application No. 11/274,007, filed on Nov. 15, 2005, now Pat. No. 7,744,848.

(51) Int. Cl.
*B01J 8/00* (2006.01)
*G05D 23/00* (2006.01)
*B01J 19/00* (2006.01)
*F27B 15/08* (2006.01)
*F27B 15/14* (2006.01)
*C22B 4/00* (2006.01)
*C22C 29/12* (2006.01)
*B22F 9/00* (2006.01)

(52) U.S. Cl. ........ 422/233; 422/109; 422/129; 422/145; 422/146; 422/232; 423/632; 75/10.15; 75/232; 75/245; 75/246

(58) Field of Classification Search .......... 422/109, 422/129, 145, 146, 232, 233; 423/632; 75/10.15, 75/232, 245, 246, 522; 148/287
See application file for complete search history.

(56) References Cited

U.S. PATENT DOCUMENTS

| | | | |
|---|---|---|---|
| 0,672,192 A | 4/1901 | MacDonald | |
| 2,545,932 A | 3/1951 | Tiddy et al. | |
| 2,693,409 A | 11/1954 | Stephens, Jr. | |
| 2,694,656 A | 11/1954 | Camras | |
| 2,870,003 A * | 1/1959 | Cavanagh | 423/152 |
| 2,900,236 A | 8/1959 | Speed et al. | |
| 3,210,180 A | 10/1965 | Jukola | |
| 3,276,858 A | 10/1966 | Pfeiffer et al. | |
| 3,843,773 A | 10/1974 | Pingaud | |
| 3,928,709 A | 12/1975 | Audran et al. | |
| 4,311,684 A | 1/1982 | Umeki | |
| 4,376,714 A | 3/1983 | Pingaud | |
| 4,436,681 A | 3/1984 | Barczak et al. | |
| 4,629,500 A | 12/1986 | Janz et al. | |

(Continued)

*Primary Examiner* — Walter Griffin
*Assistant Examiner* — Natasha Young
(74) *Attorney, Agent, or Firm* — Eckert Seamans Cherin & Mellott, LLC; Carol A. Marmo, Esquire; Daniel C. Abeles, Esquire

(57) ABSTRACT

A process of producing magnetite with a high purity of greater than 90% magnetite, more typically greater than 98% magnetite, by reducing powdered hematite into magnetite under maximum temperatures of about 700 to 1300° C. against a counter-current of or concurrent with methane or natural gas in a heating device. The amount of methane used to reduce the hematite may be about 0.18 and 1.8 standard cubic feet of methane per pound of hematite. A product of high purity methane produced from the process is also provided, where the magnetite is below 1 µM in diameter and has a magnetic saturation greater than 90.0 emu/g. Corresponding apparatus using an improved feeder system for powdered hematite is provided.

14 Claims, 12 Drawing Sheets

U.S. PATENT DOCUMENTS

| | | |
|---|---|---|
| 4,822,509 A | 4/1989 | Bishara et al. |
| 5,348,160 A | 9/1994 | Kindig |
| 5,512,195 A | 4/1996 | Mano et al. |
| 5,794,791 A | 8/1998 | Kindig |
| 5,837,051 A | 11/1998 | Krekel et al. |
| 6,302,952 B1 | 10/2001 | Mobbs et al. |
| 6,827,757 B2 | 12/2004 | Ozaki et al. |

\* cited by examiner

700° C

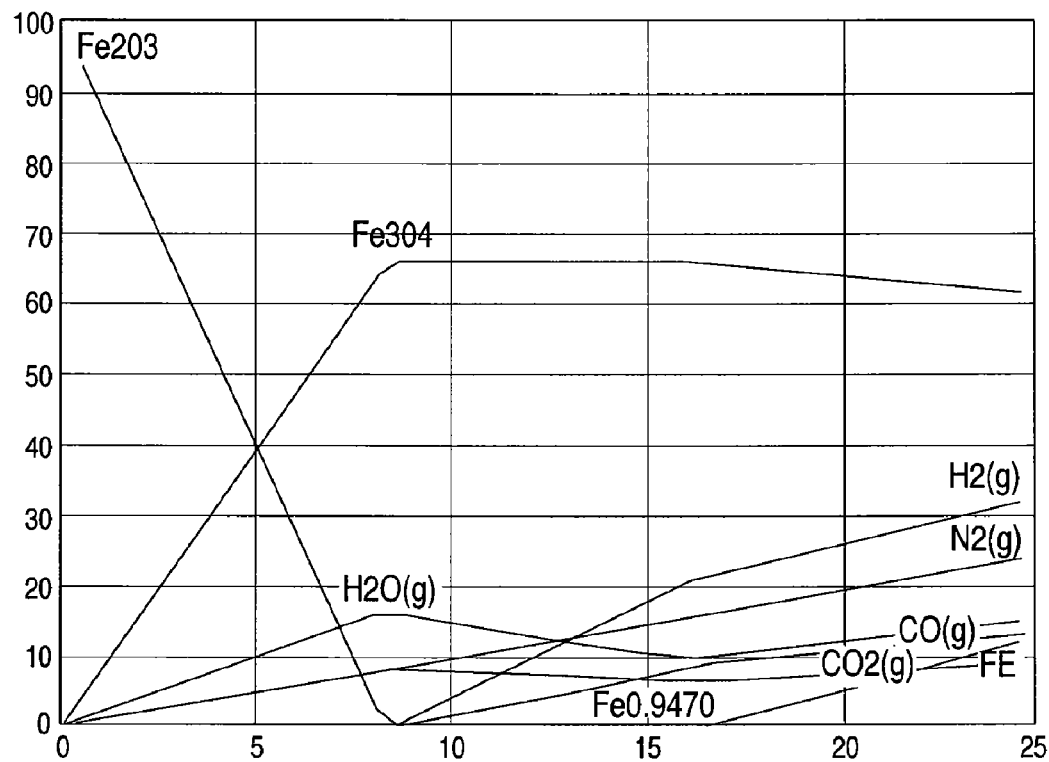
FIG. 7  750° C
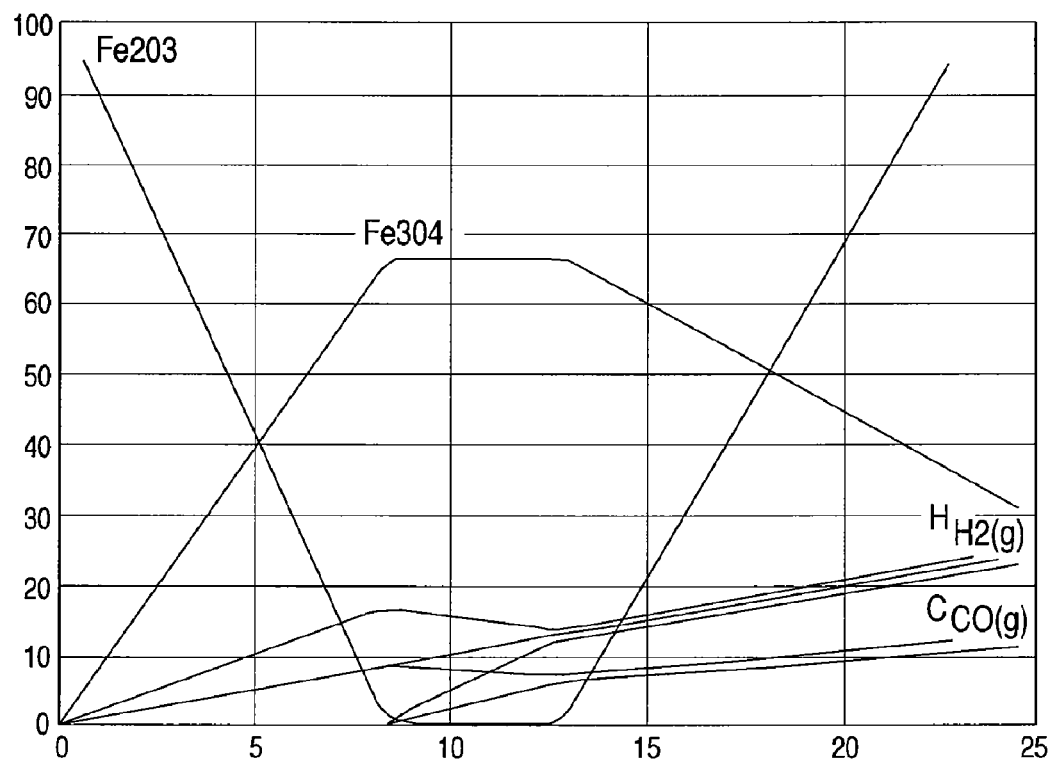
FIG. 8  800° C

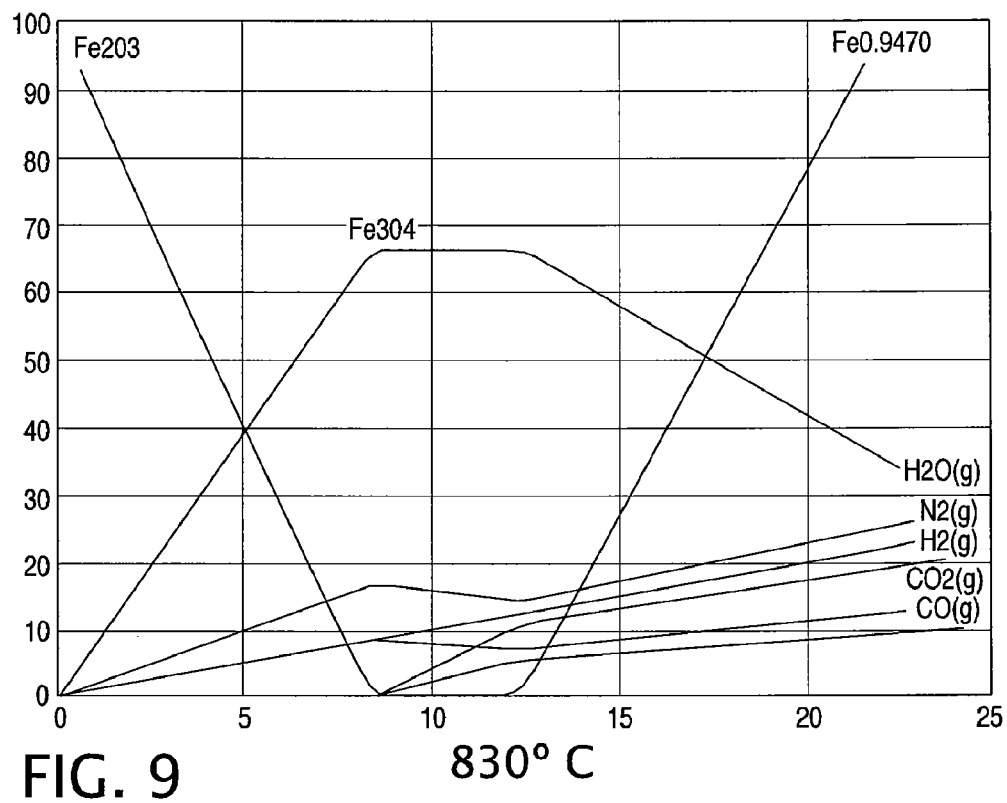
FIG. 9  830° C
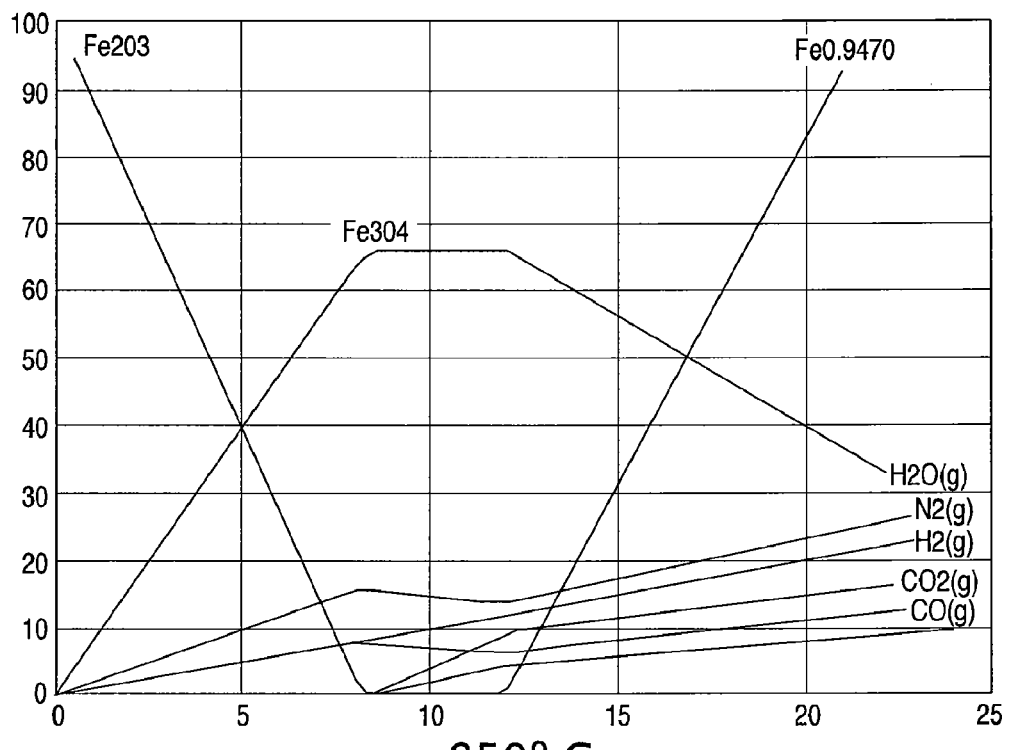
FIG. 10  850° C

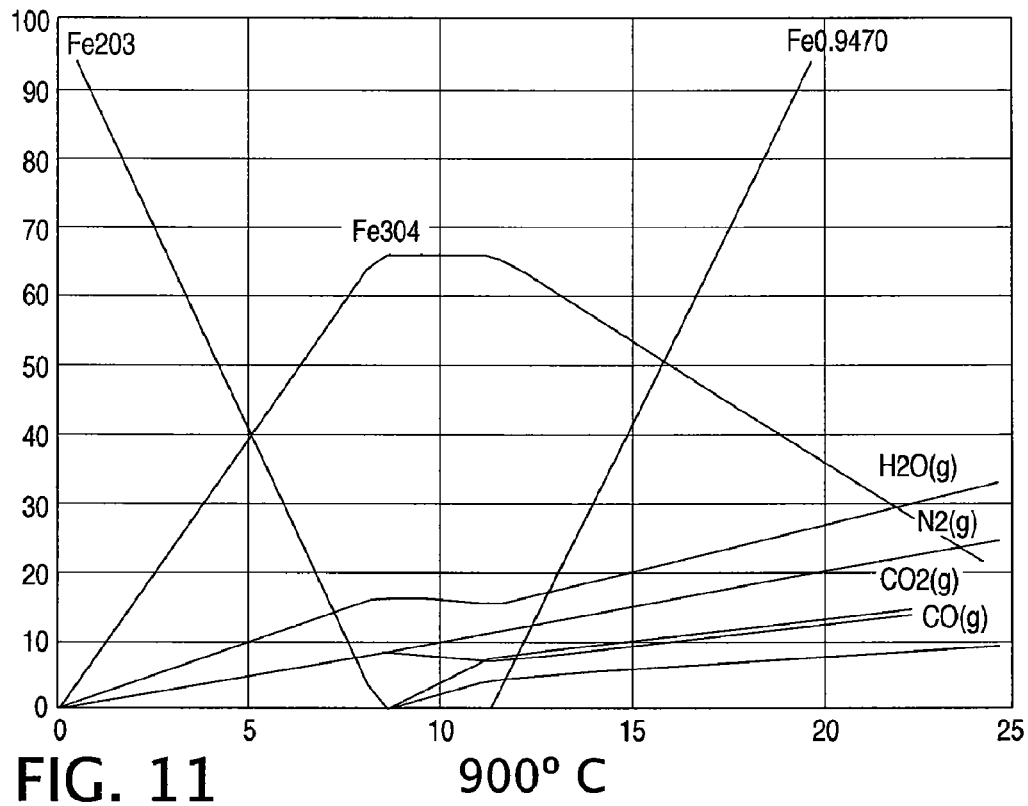
FIG. 11  900° C
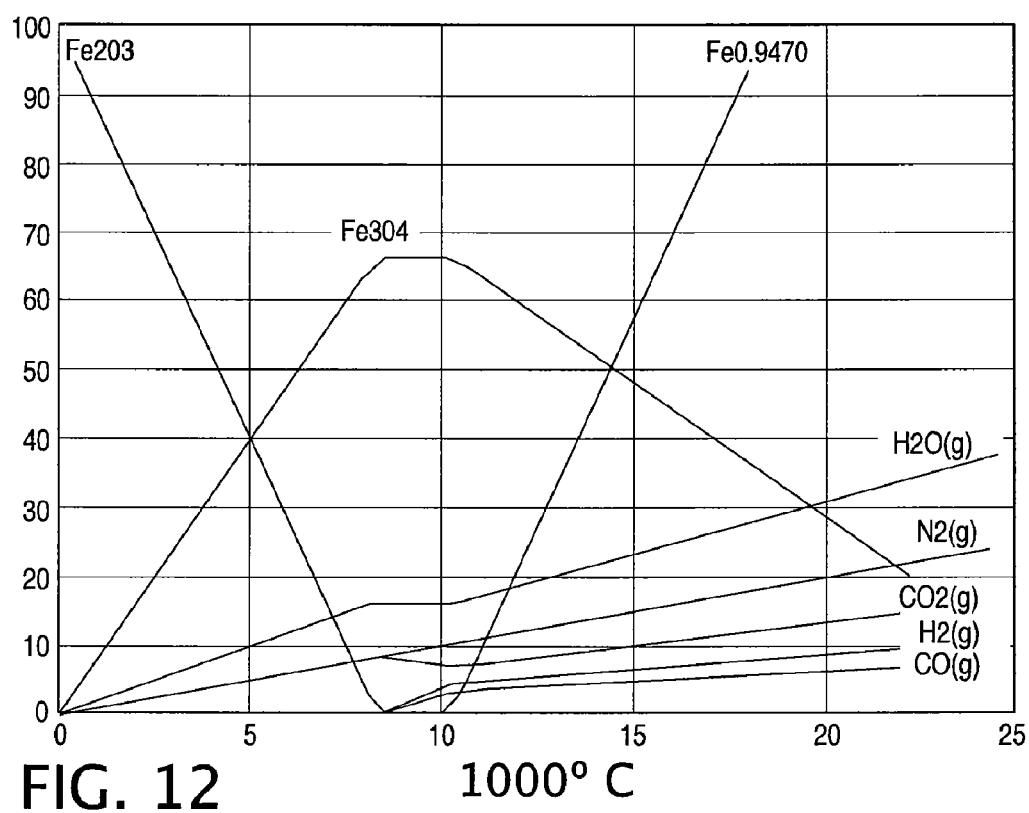
FIG. 12  1000° C

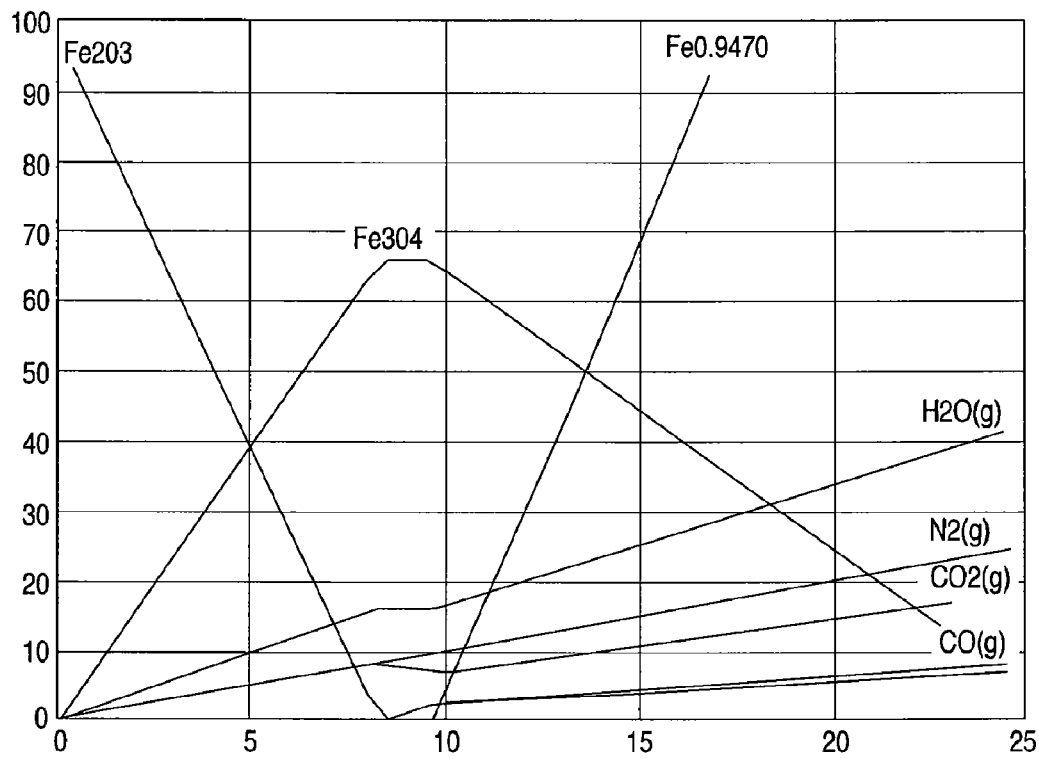
FIG. 13   1100° C
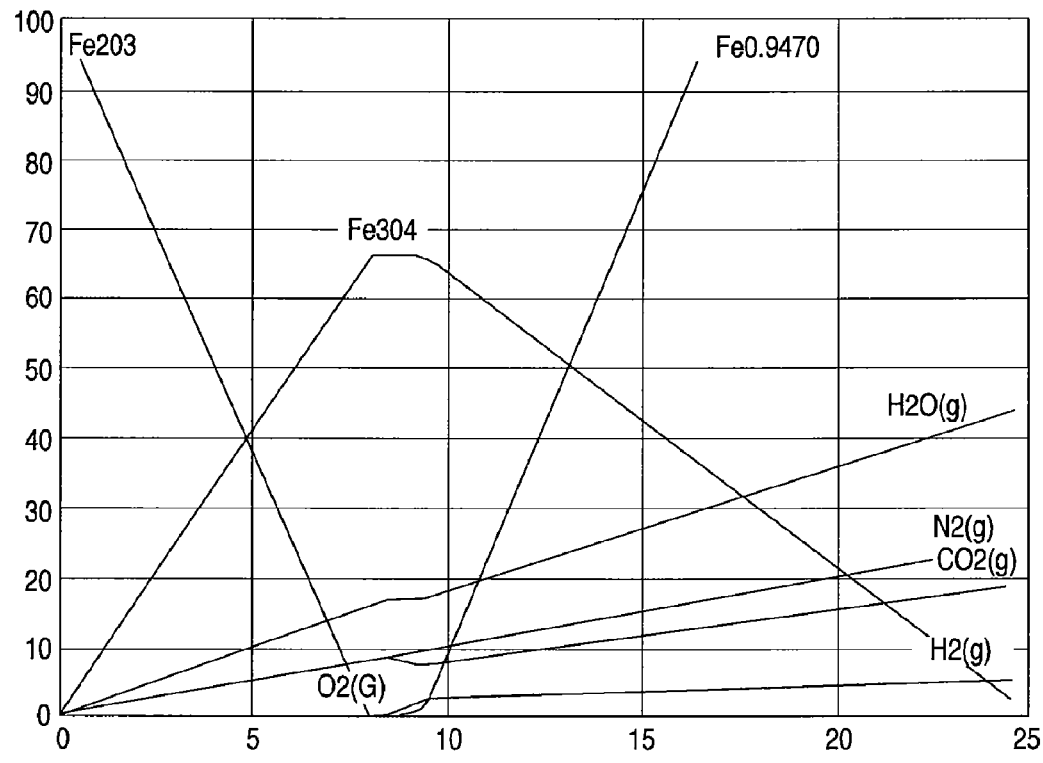
FIG. 14   1200° C

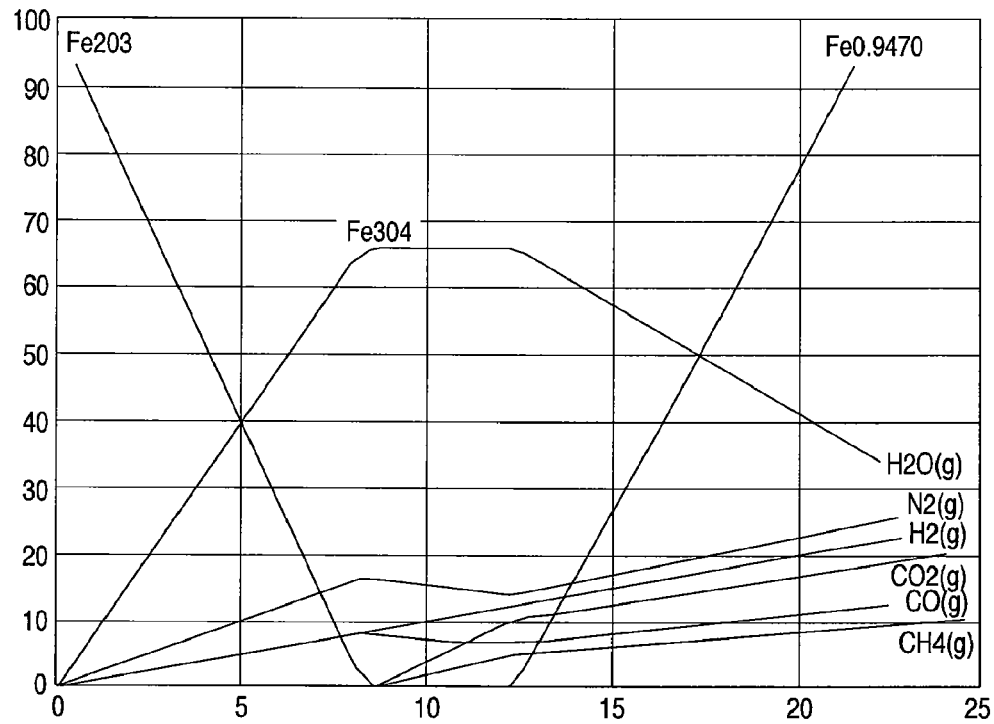
FIG. 16  830° C With N₂
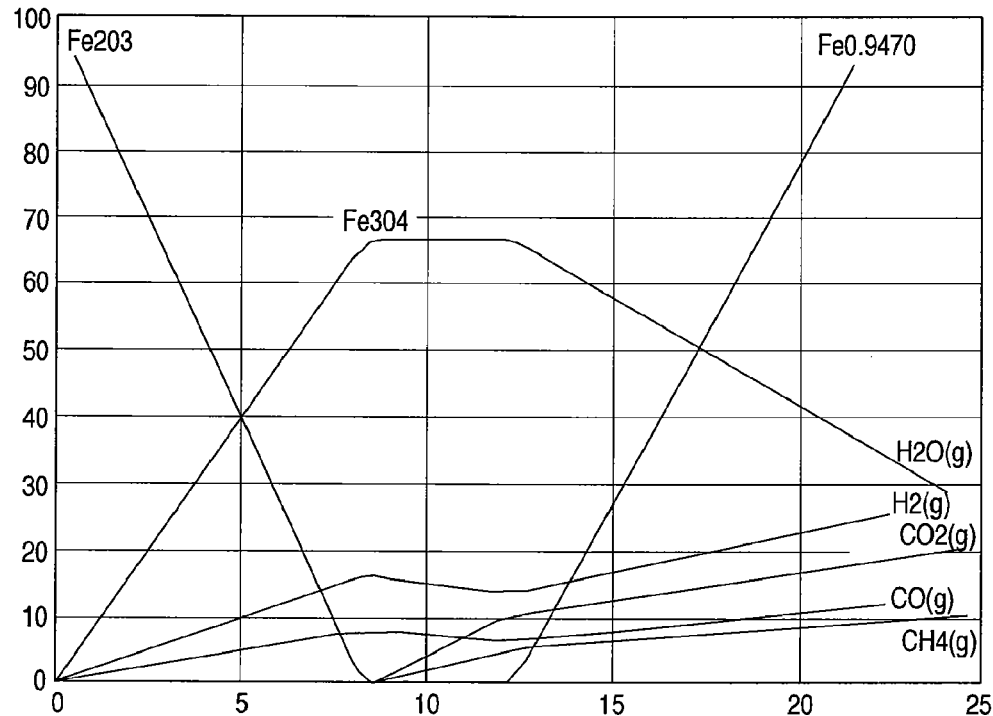
FIG. 17  830° C Without N₂

HIGH PURITY MAGNETITE FORMATION PROCESS AND APPARATUS, AND PRODUCT THEREOF

The present application is a divisional of U.S. patent application Ser. No. 11/274,007, now U.S. Pat. No. 7,744,848, filed Nov. 15, 2005, and entitled "High Purity Magnetite Formation Process and Apparatus, and Product Thereof," which is herein incorporated by reference in its entirety.

BACKGROUND OF THE INVENTION

1. Field of the Invention

The present invention generally relates to a process for producing high purity magnetite from hematite, and a high purity magnetite product formed from the process thereof. Specifically, the invention relates to a process of reducing powdered hematite into magnetite with methane or natural gas, wherein the hematite is reduced in a heating device by a counter-current or concurrent flow of the methane or natural gas, while holding the solids for a specific time at a temperature to effect the reduction to magnetite. The invention further relates to a heating device for performing the method of the invention.

2. Description of the Prior Art

It has been known for many years to convert hematite, composition $Fe_2O_3$, into magnetite, composition $Fe_3O_4$. Synthetic hematite is a basic reddish brown iron mineral frequently obtained as a byproduct during hydrochloric acid regeneration in operations using this acid to clean or pickle steel products prior to subsequent processing. Synthetic magnetite is utilized for its magnetic and pigmentation properties.

Conversion of hematite into magnetite is known to occur in the presence of hydrogen or carbon monoxide gas or a liquid, wherein the liquid may be petroleum. The hydrogen or carbon monoxide gas or liquid product acts as a reduction agent and reduces the hematite, allowing magnetite to form.

It has been known to spray roast ferrous chloride to produce hematite, pelletize the hematite, and reduce the hematite to magnetite in a heating device at temperatures of about 900° C. to 1000° C. The reduction is performed with carbon monoxide and hydrogen with the flow of reducing gases counter-current to the flow of hematite pellets which are fed into the reactor opposite a burner flame, and which are heated to greater temperatures as the pellets move through the reactor chamber, attaining maximum temperature near the product discharge. Reducing conditions are preferably maintained throughout the reactor, such as by injection of additional reducing gas into the reactor near the product discharge zone. See for example, U.S. Pat. Nos. 5,348,160 and 5,794,791. No guidance, however, is given as to operating conditions such as gas to solid ratio, flow rates or purity levels It has also been known to reduce hematite with a reducing gas in the presence of a nonferrous inorganic compound powder at temperatures of about 200 to 700° C., stopping reduction of the powder at about midstream of the reduction to yield a partially reduced powder, and oxidizing a surface of the partially reduced powder with an oxygen-containing gas to yield a composite powder comprising magnetite and iron. The reducing gas can be hydrogen, carbon monoxide, methane or ethane. See, for example, U.S. Pat. No. 6,827,757. The purity for such a process is about 83%.

It has also been known to reduce hematite with organic liquid or low temperature aqueous slurries. See U.S. Pat. Nos. 6,302,952, 5,512,195, 4,376,714 and 3,928,709.

It has also been known in the distant art to reduce hematite with other substances, such as petroleum residue, alcohols and steam, typically at temperatures below 700° C. See for example, U.S. Pat. Nos. 4,311,684, 2,693,409 and 672,192.

In the use of known prior art systems, which require low temperatures, reduction agents that are not methane or natural gas, and which lack guidance as to the amounts of reduction agent to use in relation to the amount of hematite, a purity yield of magnetite from the reduction of hematite is typically in the 80% region, at best. In addition, such processes may require numerous additional steps to perform the reduction properly, which make production on a commercial scale difficult.

There remains, therefore, a very real and substantial need for an improved process to create a high purity magnetite that also presents a process with definite guidelines that are simple, effective and efficient to use, and can further be readily scaled to a commercial scale.

SUMMARY OF THE INVENTION

The present invention has met the hereinbefore described need.

In a preferred method of the present invention, a process for producing a high purity magnetite composition is disclosed by feeding hematite, preferably powdered hematite, into a first end of a heating device for movement therethrough, simultaneously feeding methane into a second end of a heating device for movement therethrough, such that the methane moves counter-current or concurrent to the hematite, and preferably heating the heating device to a temperature of about 700-1300° C.

A product produced by the above method is also provided.

An apparatus to utilize the above method and produce the above product is also provided. The apparatus has a heating device having a first end and a second end, the first end slightly elevated above the second end, a heating device having a first end and a second end, the first end slightly elevated with respect to the second end, a feed zone adjacent the first end of the heating device for feeding hematite into the heating device, a discharge zone adjacent the second end of the heating device for receiving the high purity magnetite, least two temperature zones within the heating device, a multiplicity of heating elements within the heating device, the multiplicity of heating elements operatively associated with the heating device for heating a first temperature zone having a first temperature and a second temperature zone having a second temperature, wherein the second zone has a higher temperature than the first zone, the second zone starting and ending between about 15% of the distance from the first end of the heating device to the second end and the second end of the heating device, and a gas passage for conveying gas into the heating device. The apparatus has air locks on its first and second ends sufficient to provide a gas tight seal to up to about five inches of water column.

It is an object of the present invention to provide a process for producing high purity magnetite by reducing hematite with a counter-current or concurrent flow of methane or natural gas, and a product produced from the process thereof.

It is an object of the present invention to provide a process and a product thereof that includes a specific gas to solids ratio range that allows one to determine the flow rates of the hematite and/or methane into the heating device, thereby providing simple guidelines for achieving high purity magnetite.

It is another object of the present invention to provide a process and a product thereof that includes a more preferred maximum temperature range of about 750-1200° C. and a most preferred temperature range of about 800-900° C., thereby providing a level of optimum performance.

It is another object of the present invention to provide a process and a product thereof that includes temperature gradients wherein a maximum temperature is maintained in a second zone and a pre-heating temperature is maintained in a first zone, wherein there is at least one additional zone after the second zone with a temperature lower than that of the second zone, thereby ensuring that the product is not at maximum temperature when exiting the heating device.

It is another object of the present invention to provide a process and a product thereof that includes two temperature gradients, wherein a maximum temperature is maintained in a second zone and a pre-heating temperature is maintained in a first zone.

It is another object of the present invention to provide a product that is at least 97% pure magnetite, and further has magnetic saturation greater than 85.0 emu/g.

It is a further object of the present invention to provide a scalable process that may be run at high commercial production levels to produce high amounts of high purity magnetite, or may further be downscaled for smaller runs.

These and other objects of the invention will be more fully understood from the following description of the invention on reference to the illustrations appended hereto.

BRIEF DESCRIPTION OF THE DRAWINGS

FIG. 7 is a graph showing the gas to solid ratio of methane to hematite in a reaction run at 750° C.

FIG. 8 is a graph showing the gas to solid ratio of methane to hematite in a reaction run at 800° C.

FIG. 9 is a graph showing the gas to solid ratio of methane to hematite in a reaction run at 830° C.

FIG. 10 is a graph showing the gas to solid ratio of methane to hematite in a reaction run at 850° C.

FIG. 11 is a graph showing the gas to solid ratio of methane to hematite in a reaction run at 900° C.

FIG. 12 is a graph showing the gas to solid ratio of methane to hematite in a reaction run at 1000° C.

FIG. 13 is a graph showing the gas to solid ratio of methane to hematite in a reaction run at 1100° C.

FIG. 14 is a graph showing the gas to solid ratio of methane to hematite in a reaction run at 1200° C.

FIG. 16 is a graph showing the gas to solid ratio of methane to hematite in a reaction run at 830° C. with methane diluted by nitrogen.

FIG. 17 is a graph showing the gas to solid ratio of methane to hematite in a reaction run at 830° C. with methane not diluted by nitrogen.

DESCRIPTION OF THE PREFERRED EMBODIMENTS

Figure 1A:
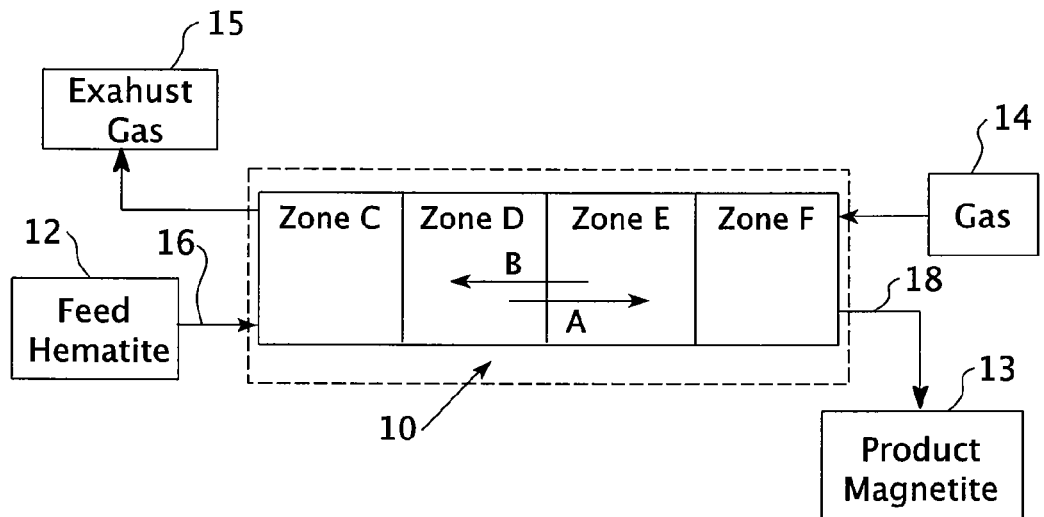
FIG. 1A is a schematic drawing of the process of the invention, showing the heating device and reactants used, wherein the hematite and gas are conveyed counter-current to each other.

As employed herein, "hematite" means hematite or hematite that is in the process of being converted to magnetite, and may therein contain a combination of hematite and magnetite.

As employed herein, "gas" without a "natural" prefix means methane gas or natural gas or a combination thereof, or any other gas wherein a percentage is methane, wherein the gas may further be diluted by nitrogen or another inert gas.

As employed herein, "heating device" means an apparatus suitable for achieving a thermal energy necessary for temperatures of the process and suitable for conveying and/or allowing the hematite and gas to move counter-current or concurrent to each other and expressly includes but is not limited to a kiln or a fluid bed reactor.

As employed herein, the terms "feed zone" and "discharge zone" refer to areas adjacent to the heating device, respectively where hematite enters the heating device and where magnetite exits the heating device, as it is oriented in the drawings. However, it is to be understood that the invention may assume various alternative configurations except where expressly specified to the contrary. It is also to be understood that the specific elements illustrated in the drawings and described in the following specification are exemplary embodiments of the invention. Therefore, specific dimensions, orientations and other physical characteristics related to the embodiments disclosed herein are not to be considered limiting unless expressly stated to the contrary.

As employed herein, the statement that two or more parts are "coupled" together shall mean that the parts are joined together either directly or joined through one or more intermediate parts.

Under the method of the invention, hematite, preferably powdered hematite wherein about 90% of the hematite particles are within the range of 0.15 to 25 μm, enters a heating device for conveyance therethrough against a counter-current or concurrent flow of methane or natural gas, wherein the methane or natural gas may optionally be diluted with nitrogen or other inert gas.

The heating device preferably contains at least two temperature zones wherein the heating device is structured such that the temperature of the highest temperature zone is in a range of about 700-1300° C., more preferably in a range of about 750-1200° C., and most preferably in a range of about 800-900° C. Under these conditions, the hematite, chemical composition $Fe_2O_3$, is reduced by methane or other natural gas into magnetite, chemical composition $Fe_3O_4$, currently believed to occur under reaction (1):

$$12Fe_2O_3 + CH_4 \rightarrow CO_2 + 2H_2O + 8Fe_3O_4 \qquad (1)$$

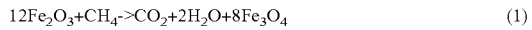

The hematite can generally be obtained from any known source of hematite. In preferred embodiments, the hematite is obtained from regeneration of spent hydrochloric acid pickling solution, wherein acid is vaporized and condensed as a pure concentrated acid, and resultant dissolved iron oxide is removed from solution as a fine hematite precipitate.

One embodiment of a method and apparatus for producing high purity magnetite from hematite is shown in FIG. 1A. In this embodiment, a source of hematite, as shown in block 12, is conveyed through feed zone 16 into heating device 10 for movement therethrough. The hematite moves through the heating device by moving through, respectively, temperature zone C, temperature zone D, temperature zone E and temperature zone F, as generally shown by arrow A. Hematite is chemically reduced to magnetite within the heating device 10, and exits the heating device 10 into discharge zone 18 as high purity magnetite, and can be collected from discharge zone 18 as high purity magnetite 13.

Figure 1B:
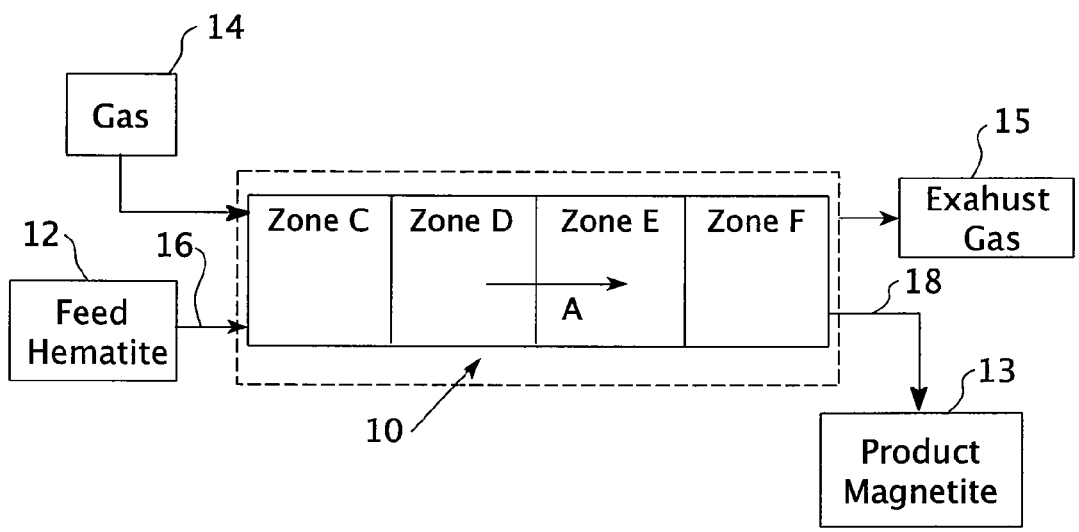
FIG. 1B is a schematic drawing of the process of the invention, showing the heating device and reactants used, wherein the hematite and gas are conveyed concurrent to each other.

Running counter-current to the hematite in FIG. 1A is gas 14 which may be or contain natural gas, wherein the natural gas preferably consists largely of methane. In alternative embodiments, methane can be used instead of or in addition to natural gas. The gas is conveyed through discharge zone 18 into heating device 10. The gas moves within the heating device 10 along a path as generally shown by arrow B, counter-current to the hematite moving along arrow A, such that the gas chemically reduces the hematite to magnetite and is decomposed into exhaust gas or gases 15. The exhaust gas or gases 15 exit through feed zone 16. If desired, concurrent flow in direction A of both hematite and gas may be employed to chemically reduce the hematite to high purity magnetite in heating device 10, as shown in FIG. 1B. In this embodiment, hematite 12 and gas 14 are both fed into heating device 10 through feed zone 16 such that the gas chemically reduces the hematite to magnetite and is decomposed into exhaust gas or gases 15. The exhaust gas or gases 15 exit through discharge zone 18.

The gas can be conveyed into the heating device 10 with a feed system through feed zone 16 (FIG. 1B) or discharge zone 18 (FIG. 1A) with any suitable conveyance apparatus known in the art. In low volume test runs, the feed system is most preferably a high pressure cylinder equipped with a rotameter flow control to allow for consistent and controllable gas flow. This enables better control of low flow rates, such as those less than one standard cubic foot per minute, than other types of apparatus such as, for example, wet test flow meters. With larger scale production, various gas flow control devices are known in the art that do not require high pressure gas supplies.

In preferred embodiments, the ratio of the methane conveyed into the heating device is within the range of 0.18 to 1.8 standard cubic feet (scf) of methane per pound of hematite. The flow rates of the gas and produce can be determined from this ratio. For clarity of illustration, an example is presented.

The amount of hematite to be processed is 18,000 pounds per hour (300 per minute). To determine the preferable flow rate of methane, the pounds per minute of hematite is multiplied by the lower and upper ends of the ratio. This will provide the upper and lower levels of standard cubic feet per minute of use. The flow rate of methane within the preferred embodiment of the invention is about 0.18*300 and 1.8*300 standard cubic feet per minute (scfm), specifically about 54 and 540 scfm. This ratio holds for scaled down runs as well. In a non-commercial run, wherein about 20 pounds per hour (0.33 pounds per minute) of hematite is reduced to magnetite, the flow rate of methane would preferably be about 0.6 to 6.0 standard cubic feet per minute. Note that the "per minute" term is not limiting. The ratio can be similarly used to determine the flow rate per hour, per second, or any other time measurement desired.

The methane or natural gas entering the heating device may be diluted with nitrogen, for example, with 50% nitrogen and 50% methane and/or natural gas. However, as shown below, the amount of nitrogen included has little effect upon the ratio of methane to products used. Nitrogen may be used as a seal gas used on the discharge zone.

The amount of hematite that is conveyed into the heating device can vary widely within the spirit of the invention depending on the type of heating device used and the amount of magnetite desired. Under preferred commercial use amounts, about 14,000 to 28,000 pounds per hour of hematite are conveyed into a commercial heating device. However, the amount of hematite used can be readily scaled up or down as needed.

The interior of heating device 10 has a multiplicity of temperature zones, wherein each temperature zone corresponds to a different temperature gradient. As shown in FIGS. 1A and 1B, the four zones are labeled temperature zone C, D, E and F looking from an edge of feed zone 16 to an edge of discharge zone 18. In preferred embodiments, as depicted, heating device 10 is divided into four zones of similar dimensions. In alternate embodiments, however, the number and relative dimensions of the temperature zones can vary within the spirit of the invention. For example, the location and width of temperature zone D can vary, but preferably zone D both begins and ends anywhere within the heating device within a region preferably starting at about 15% of a length of the heating device 10 from the edge of feed zone 16 adjacent to the heating device to the edge of discharge zone 18 bordering the heating device up to about 100% of heating device 10. If temperature zone D extends the remaining length (100%) of heating device 10 after temperature zone C, temperature zones E and F would be eliminated.

The zones of the heating device 10 heat the hematite to convert it to magnetite. The present embodiment heats the product with four zones of varying temperatures, wherein, the highest temperature gradient is achieved in zone D, the second highest gradient is achieved in temperature zone C, the third in highest in zone E, and the lowest temperature in temperature zone F. In this embodiment, a large majority of the reduction of hematite to magnetite occurs at the highest temperature gradient of temperature zone D. Temperature zone C is an important preheating step, wherein the powdered hematite is brought to a temperature close to where reduction takes place, typically below 750° C. This preheating enables the temperature zone D reduction to happen at a very high rate. Temperature zones E and F, which occur downstream of temperature zone D in the path of the hematite (direction A), have a decrease in temperature to cool the magnetite product. A reducing gas atmosphere is maintained in temperature zones E and F while cooling the magnetite in order to resist a back reaction of the magnetite to hematite so that pure magnetite enters discharge zone 18.

In this embodiment, the length of temperature zone D can vary, but preferably temperature zone D starts and ends within an area in the heating device wherein the area is about 15% to 60% of the length of the heating device measuring from the feed zone to the discharge zone. In the particular embodiments shown in FIGS. 1A and 1B, temperature zone D extends from about 25% to about 50% the length of the heating device measuring from the edges of the feed zone to the discharge zone.

In further embodiments, only temperature zones E follows temperature zone D and temperature zone F is eliminated, wherein temperature zones E is a decrease in temperature from temperature zone D. Further, additional heating zones and temperature gradients may be added to the heating device beyond the four depicted in FIG. 1A or 1B. Thus, if the heating device 10 contains three temperature zones C, D and E, temperature zones E is adjacent to temperature zone D opposite the temperature zone C, the temperature zones E of a temperature less than the temperature zones D such that the temperature zones D is between two temperature zones, C and E, of lesser temperature. When the heating device contains a fourth temperature zones F adjacent the temperature zones E opposite the temperature zones D, the same conditions apply for the three temperature zones with the addition of fourth temperature zone F being of a lesser temperature than the temperature zone E to further cool the hematite while resisting a back reaction.

In alternative embodiments, temperature zone D can extend the length of the heating device from the end of temperature zone C up to the discharge zone. At full extension, both cooling temperature zones E and F are eliminated. In this embodiment, the discharge temperature zones comprises a substantially oxygen free atmosphere such as nitrogen to prevent oxidation of the magnetite back into hematite. A cooling compound such as a water heat exchanger may be further contained within the discharge zone to cool the magnetite after it leaves the heating device.

In a preferred embodiment, the heating device 10, as shown in FIGS. 2 through 5, is a kiln. The preferred heating device 10 includes an interior tube 30 disposed generally co-axially within an outer casing 32. Interior tube 30 rotates about its longitudinal axis, wherein the rotation is caused by a motor (not shown) or other like power source. Interior tube 30 preferably is oriented at an inclination, wherein the interior tube 30 has an entry end and discharge end, the entry end being elevated with respect to the discharge end. The inclination might be from about 0.25 to 5.00 degrees, for example. Powdered hematite enters the interior tube 30 of heating device 10 through feed tube 22 within feed zone 16, and the rotation, inclination and lifters 44 (FIG. 5) of interior tube 30 cause general downward movement of the hematite through heating device 10. In preferred embodiments, interior tube 30 has a narrowed frontal portion 29. Heating elements 48, 50, 52 and 54 heat interior tube 30. The heating elements 48, 50, 52 and 54 are on, within, or formed through casing 32. The heating elements 48, 50, 52 and 54 are preferably natural gas burners, but other types of heating elements known in the art may be used. Casing 32 preferably includes one or a multiplicity of flues 34, 36 and 38. Most preferably three to four flues are provided to exhaust combustion products of heating elements 48, 50, 52 and 54.

In preferred embodiments of the invention, the heating device 10 includes at least four heating elements 48, 50, 52 and 54 capable of creating at least four temperature zones C, D, E and F within interior tube 30. Temperatures of the four temperature zones C, D, E and F can be controlled through adjustments of heating elements 48, 50, 52 and 54. The temperatures of the temperature zones C, D, E and F are preferably individually monitored by a temperature monitoring device (not shown) which can be any monitoring device known in the art such as thermocouples. The temperature of the temperature zones C, D, E and F can thereby be adjusted in accordance with information obtained by the monitoring devices. The heating elements 48, 50, 52 and 54 can be adjusted directly, remotely, or by any means known in the art. In certain embodiments, the temperature can be controlled, if desired, from remote locations with the use of a controlling means such as a computer. For example, output from temperature zones C, D, E and/or F and/or monitoring devices can be delivered to a computer for comparing temperature with stored desired temperatures and issuing a signal to a controller to operate heating elements 48, 50, 52 and 54 to adjust the temperature of temperature zones C, D, E and F to the desired temperature.

The preferred heating device 10 is preferably an indirect fired kiln heated by the heating elements 48-52, such that the gases chemically reducing the hematite are separated from any gases utilized in the heating elements 48, 50, 52 and 54 by interior tube 30. This is generally achieved by having one or a multiplicity of heating elements 48, 50, 52 and 54 outside of interior tube 30 while the gases to chemically reduce hematite are inside interior tube 30. Alternatively, however, the heating device 10 may be a direct kiln where the gas used for heating the process are the same gases used to reduce the hematite to magnetite.

The heating elements 48-52 type, shape, length and radius can all vary depending on the amount of throughput and residence time desired. These parameters would be known to one skilled in the art.

The hematite enters heating device 10 through feed tube 22 of feed zone 16, is chemically reduced within heating device 10 while traveling in the direction of arrow A, and exits into the discharge zone 18 as high purity magnetite. In discharge zone 18, the high purity magnetite can be captured, stored and used by any means known in the art. In one embodiment shown in FIGS. 2 and 3, the discharge zone includes funnel 40 which delivers the high purity magnetite to discharge chute 42. The high purity magnetite is discharged through discharge chute 42 and collected in any desired manner. The final high purity magnetite product has a desirable blue/black color. Further, the magnetite could be ground in a grinding process subsequent to collection to establish the desired particle size and/or to meet pigmentation requirements.

During processing of hematite, gas may be conveyed through gas passage 44, into discharge chute 42, through funnel 40, and into interior tube 30 wherein it moves counter-current to the hematite. To prevent substantial loss of gas out of a bottom of discharge chute 42 and to permit gas flow into interior tube 30, when it is desired to discharge magnetite, an air lock (not shown) is preferably provided within discharge chute 42 having an upper valve and lower valve, wherein the upper valve is closed and the lower valve is opened to discharge magnetite under the influence of gravity. Prior to and subsequent to discharge, the lower valve is closed and the upper valve is opened. The air lock enables magnetite to exit discharge chute 42 with minimal gas loss. Alternatively, gas supply is terminated by closing a gas valve (not shown) which is not part of the air lock and magnetite is discharged under the influence of gravity by opening the bottom of discharge chute 42.

Figure 2:
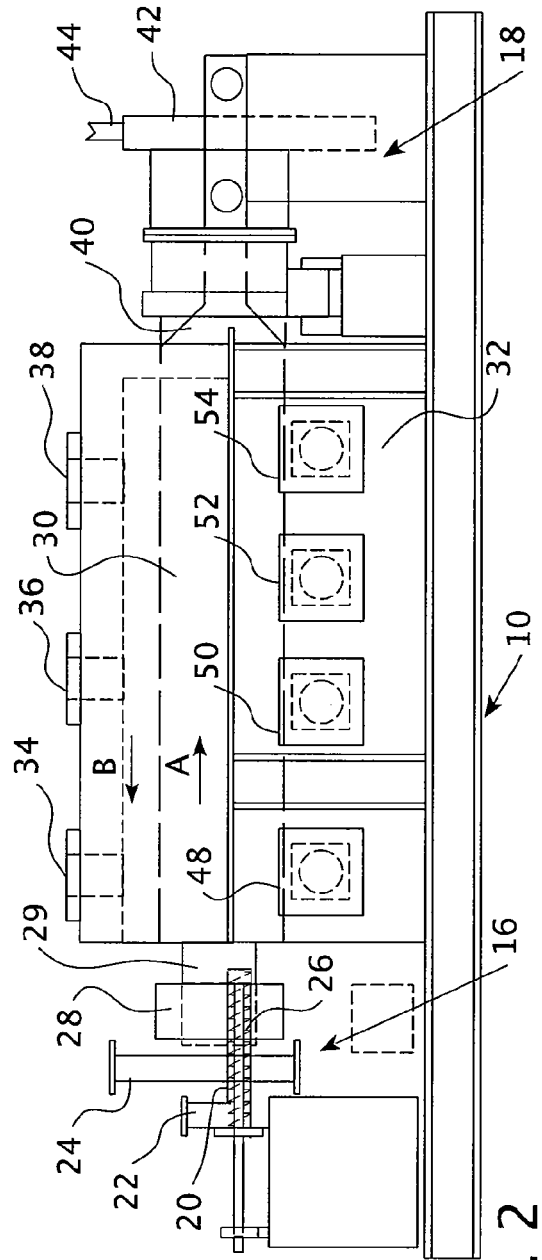
FIG. 2 is a front elevational view partially broken away of a form of apparatus employable with the present invention.
Figure 3:
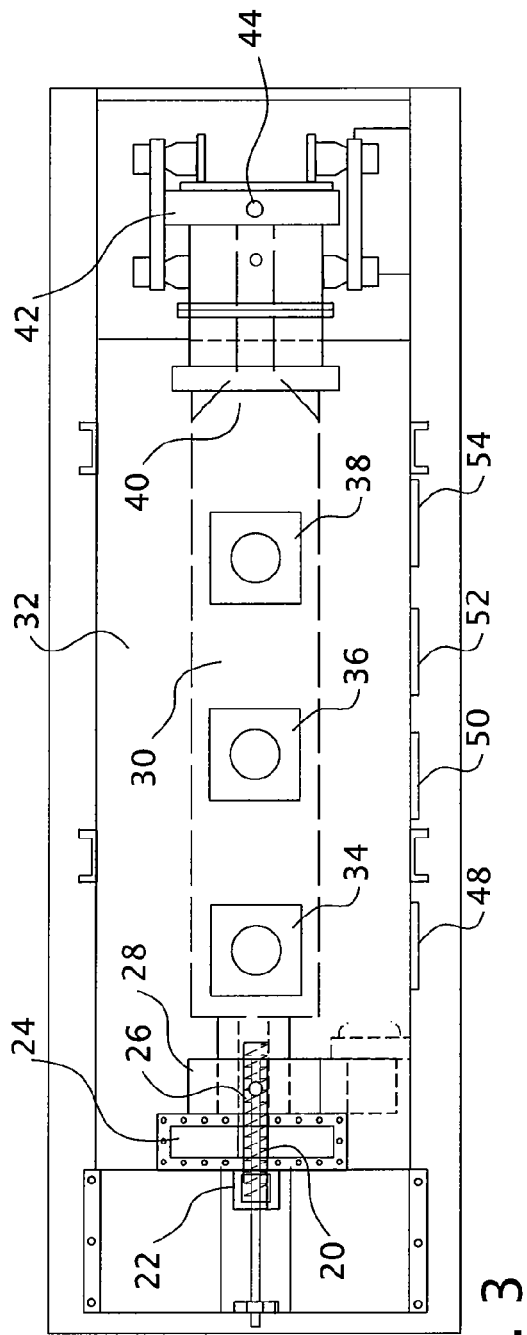
FIG. 3 is a top plan view of the apparatus of FIG. 2.

Gas runs concurrent or counter-current to the hematite within interior tube 30. In the embodiment of FIGS. 1A and 2, gas runs counter-current to the hematite, wherein the gas is conveyed into discharge zone 18 through gas passage 44. The gas enters heating device 10 from discharge zone 18 for movement therethrough counter-current the hematite as indicated by arrow B. The gas exits the feed zone 16, preferably through flue 24, as exhaust gas after passing through interior tube 30. In alternate embodiments, wherein the gas runs concurrent to the hematite in the direction of arrow A, gas is preferably conveyed into the feed zone 16 through flue 24 and upwardly exits the discharge zone 16 through gas passage 44. An airlock as employed above may also be employed here, such that during typical processing the lower valve would be closed and the upper valve open, and during magnetite discharge the lower valve is open and the upper valve is closed.

Figure 4:
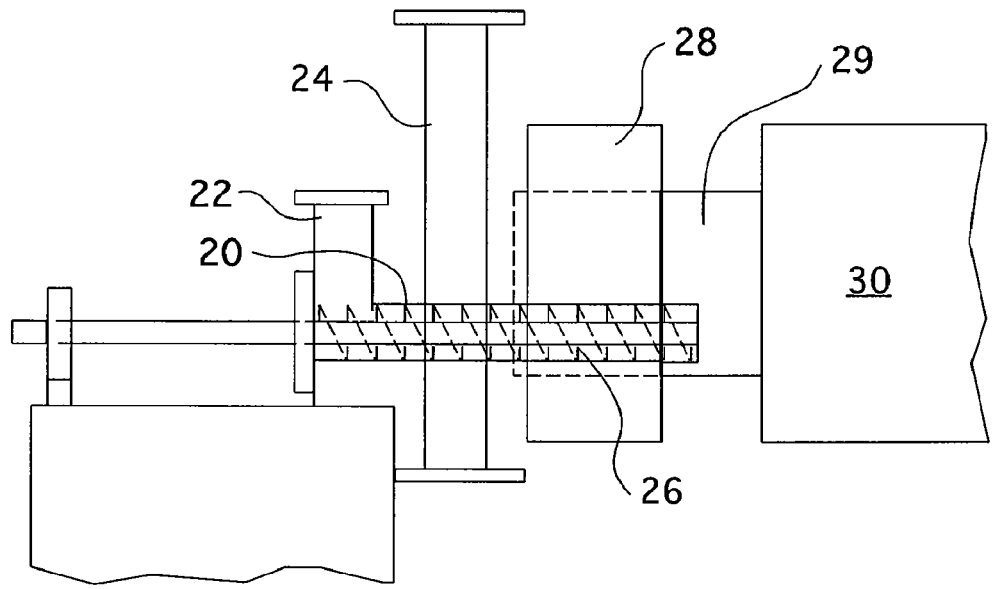
FIG. 4 is an enlarged view of a portion of FIG. 2 showing a feed zone.

A preferred embodiment of feed zone 16 is shown in FIG. 4. Feed zone 16 includes, feed tube 22, flue 24, auger tube 20 housing auger 26, and seal 28. The seal is in intimate contact with narrow extension 29 or interior tube 30 and resists undesired escape of gas there-between while facilitating efficient delivery of hematite from stationary auger tube 20 to rotating interior tube 30. The seal may further include bellows (not shown) to bridge a gap between the seal 28 and the flue 24. To convey hematite into heating device 10, hematite is delivered into feed tube 22 which delivers hematite to auger tube 20 within which helical auger 26 is located. Auger 26 is rotated by any suitable motor (not shown) or like power source at a desired speed to advance the hematite at a rate consistent with the processing method. To resist hematite from sticking to itself, feed zone 16 and/or heating device 10, the temperature of feed zone 16 preferably does not to exceed 700° C. Overheating the material upon entry into the heating device 10 may decompose some of the hematite into wuestite, an undesirable sticky material that increases material buildup in heating device 10 and feed zone 16. Wuestite typically exists in unstoichiometric forms such as $FeO_{0.947}$. Hereinafter wuestite will be referred to as $FeO_{0.947}$ or, for simplicity, FeO. In order to control the temperature of feed zone 16, air can be introduced into the feed zone 16 as a cooling means to, for example, counteract excess heat emanating from heating device 10.

Figure 5:
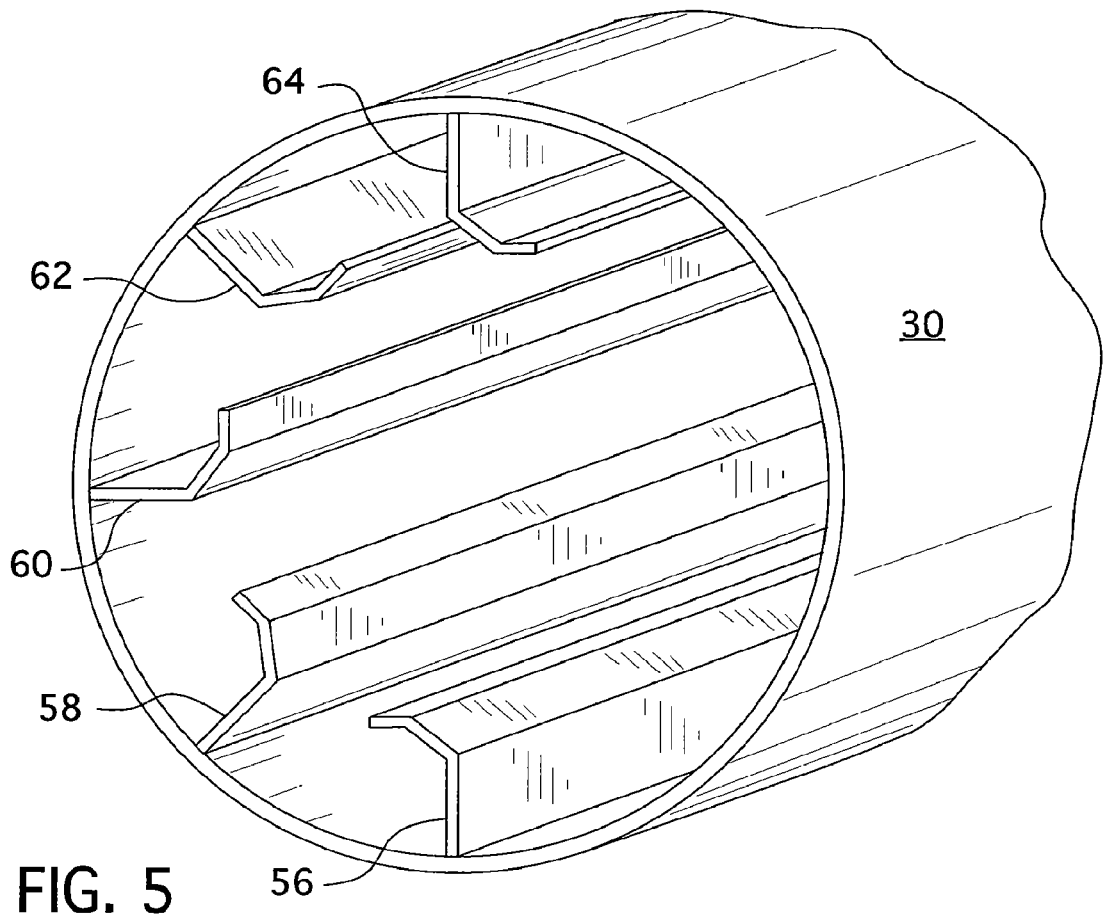
FIG. 5 is a partially broken away perspective view of a form of an interior tube employable with the present invention.

As shown in FIG. 5, lifters 56, 58, 60, 62 and 64 are axially extending and generally radially oriented and secured to an interior surface of interior tube 30 in spaced relative relationship. Lifters 56, 58, 60, 62 and 64 have edges secured to the interior surface of interior tube 30 and extend generally inwardly within interior tube 30, such that as the interior tube 30 as oriented is rotated in a clockwise direction, hematite will be elevated in the lifters 56, 58, 60, 62 and 64. When the lifters 56, 58, 60, 62 and 64 reaches a particular elevation, the lifters 56, 58, 60, 62 and 64 will drop at least a portion of the hematite back into interior tube 30. The lifters 56, 58, 60, 62 and 64 are designed and arranged such that, during rotation, at least some portion of the powdered hematite within the tube is always in a shifting state. The lifters 56, 58, 60, 62 and 64 resist sticking of the hematite to the tube or the formation of clumps of hematite by creating agitation in the hematite. Lifters 56, 58, 60, 62 and 64 also provide high gas to particle contact by creating a curtain of powder when the material discharges from the lifters as the interior tube 30 rotates. While FIG. 5 depicts lifters that cover a partial circumference of interior tube 30, it is to be understood that the number, specific shape, dimension and placement of the lifters can vary widely within the spirit of the invention, and are preferably spaced for interior tube 30's entire circumference. Further, lifters 56, 58, 60, 62 and 64 are generally coextensive with the longitudinal length of tube 30. If desired, a single lifter 56, 58, 60, 62 and 64 may extend the longitudinal length of the tube or a multiplicity of lifters may be of different longitudinally extent adjacent to each other.

Example 1

The results of small scale test runs are shown in Table 1. Hematite was fed into a kiln at a rate of 17 pounds per hour. As shown in test runs 1-26 of Table 1, gas was fed into the kiln counter-current to the hematite at a range between 0.071 to 0.223 scfm. The temperature of temperature zone D of the kiln was varied from 700-830° C. The methane was diluted such that 14-50% by volume of the outlet gas was methane. The table shows analysis of the purity of final magnetite products of the process after runs 10, 22, 24, 25, and 26. The "Red/Brown" designation indicates that analysis of the resultant product was performed by visual characterization, red=hematite, black=magnetite, red/brown=a mixture.

TABLE 1

Summary of Process Conditions/Changes/Results

| Run | CH4 Flow, (scfm) | CH4, (%) | Zone D, (° C.) | Product Purity |
|---|---|---|---|---|
| 1 | 0.071 | 14 | 700 | NA |
| 2 | 0.071 | 23 | 720 | Red/Brown |
| 3 | 0.109 | 21 | 720 | Red/Brown |
| 4 | 0.109 | 27 | 720 | Red/Brown |
| 5 | 0.109 | 30 | 740 | Red/Brown |
| 6 | 0.109 | 29 | 740 | Red/Brown |
| 7 | 0.109 | 30 | 740 | Red/Brown |
| 8 | 0.109 | 28 | 740 | Red/Brown |
| 9 | 0.109 | 27 | 740 | Red/Brown |
| 10 | 0.109 | 27 | 740 | 75% Mag |
| 11 | 0.109 | 28 | 740 | Red/Brown |
| 12 | 0.157 | 27 | 740 | Red/Brown |
| 13 | 0.157 | 31 | 750 | Red/Brown |
| 14 | 0.190 | 33 | 750 | Red/Brown |
| 15 | 0.206 | 38 | 760 | Red/Brown |
| 16 | 0.206 | 41 | 770 | Red/Brown |
| 17 | 0.206 | 41 | 780 | Red/Brown |
| 18 | 0.206 | 40 | 790 | Red/Brown |
| 19 | 0.217 | 40 | 790 | Red/Brown |
| 20 | 0.206 | 49 | 790 | Red/Brown |
| 21 | 0.206 | 50 | 800 | Red/Brown |
| 22 | 0.206 | 46 | 810 | 80% Mag |
| 23 | 0.206 | 44 | 820 | Red/Brown |
| 24 | 0.206 | 43 | 830 | 87% Mag |
| 25 | 0.206 | 43 | 830 | 95% Mag |
| 26 | 0.223 | 43 | 830 | >98% Mag |

As shown in Table 1, peak purity was achieved where the temperature zone D temperature reaches about 830° C. While other zone temperatures can obtain high purity rates, the chart depicts that a purity rate of over 98% magnetite can be achieved under the guidelines of the invention.

Figure 6:
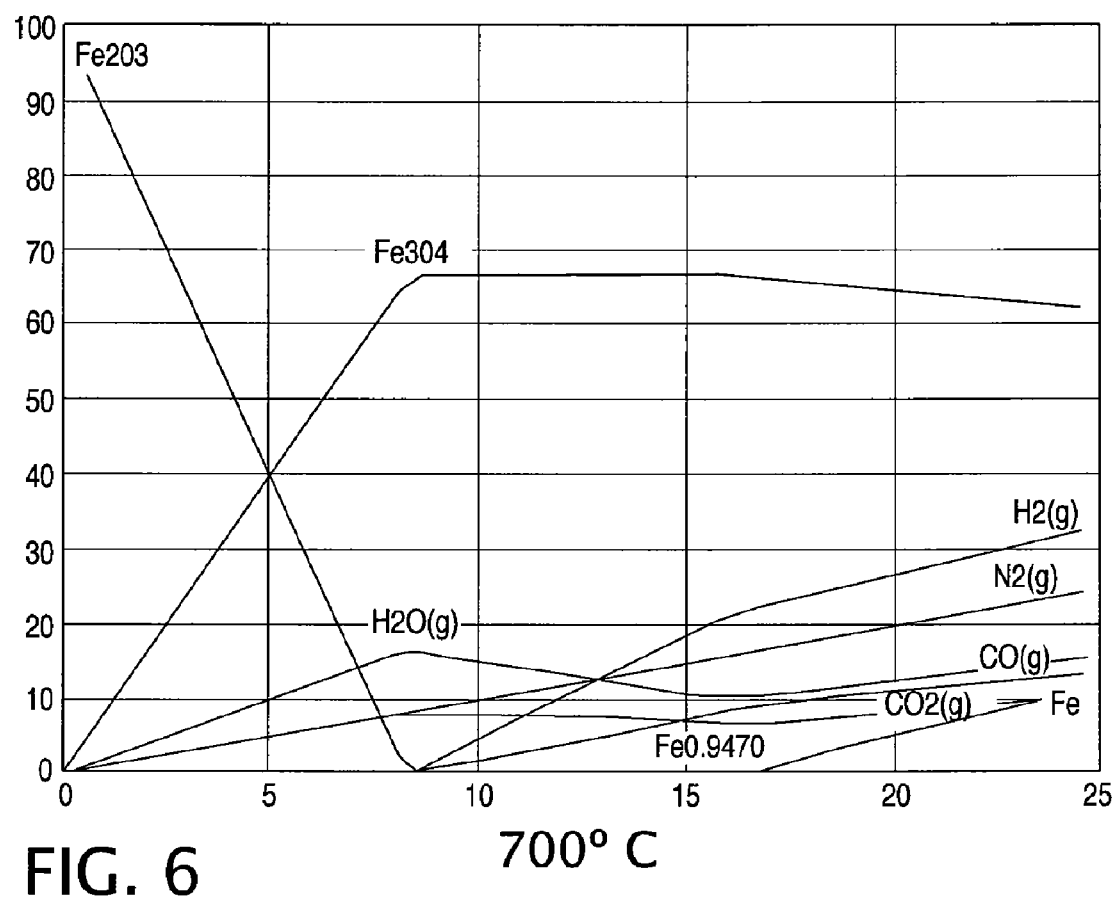
FIG. 6 is a graph showing the gas to solid ratio of methane to hematite in a reaction run at 700° C.

As shown in FIG. 6, the full conversion of hematite to magnetite occurs at about 8 kmol of methane and lasts until about 16 kmol of methane are used, at which point wuestite (FeO), a contaminant, begins to be additionally formed. However, it was found that reduction at this temperature was kinetically poor, such that the reaction tended to happen slowly. This would have to be accounted for by increasing the length of the maximum temperature zone or reducing the kiln flow rate.

Example 2

A kiln was heated such that the maximum temperature of the kiln was 750° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 7, the full conversion of hematite to magnetite occurs at about 8 kmol of methane and lasts until about 14 kmol of methane are used, at which point wuestite (FeO), a contaminant, begins to be additionally formed. However, it was found that reduction at this level was kinetically poor, such that the reaction tended to happen slowly. This would have to be accounted for by increasing the length of the maximum temperature zone or reducing the kiln flow rate.

Example 3

A kiln was heated such that the maximum temperature of the kiln was 800° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 8, the full conversion of hematite to magnetite occurs at about 8 kmol of methane and lasts until about 14 kmol of methane are used, at which point wuestite (FeO), a contaminant, begins to be additionally formed. The kinetics of the reaction were more favorable here and in the below examples, and the reduction took place at an acceptably rapid rate.

Example 4

A kiln was heated such that the maximum temperature of the kiln was 830° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 9, the full conversion of hematite to magnetite occurs at about 8 kmol of methane and lasts until about 12.5 kmol of methane are used, at which point wuestite (FeO), a contaminant, begins to be additionally formed.

Example 5

A kiln was heated such that the maximum temperature of the kiln was 850° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 10, the full conversion of hematite to magnetite occurs at about 8 kmol of methane and lasts until about 12 kmol of methane are used, at which point wuestite (FeO), a contaminant, begins to be additionally formed.

Example 6

A kiln was heated such that the maximum temperature of the kiln was 900° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 11, the full conversion of hematite to magnetite occurs at about 8 kmol of methane and lasts until about 11.5 kmol of methane are used, at which point wuestite (FeO), a contaminant, begins to be additionally formed.

Example 7

A kiln was heated such that the maximum temperature of the kiln was 1000° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 12, the full conversion of hematite to magnetite occurs at about 8 kmol of methane and lasts until about 10 kmol of methane are used, at which point wuestite (FeO), a contaminant, begins to be additionally formed.

Example 8

A kiln was heated such that the maximum temperature of the kiln was 1100° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the kiln to the entry point, wherein the gas was about 50%-methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 13, the full conversion of hematite to magnetite occurs at about 8 kmol of methane and lasts until about 9.5 kmol of methane are used, at which point wuestite (FeO), a contaminant, begins to be additionally formed.

Example 9

A kiln was heated such that the maximum temperature of the kiln was 1200° C. About 100 kmol of hematite ($Fe_2O_3$), or 15,969 kg of hematite, was conveyed into the entry point of the kiln for movement therethrough. Gas was added to the kiln in counter-current flow to the hematite, moving from the exit point of the heating device to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

As shown in FIG. 14, the full conversion of hematite to magnetite occurs at about 8 kmol of methane and lasts until about 9 kmol of methane are used, at which point wuestite (FeO), a contaminant, begins to be additionally formed.

Example 10

A kiln was heated such that the maximum temperature of the kiln was 1300° C. About 100 kmol of hematite ($Fe_2O_3$), or 15,969 kg of hematite, was conveyed into the entry point of the kiln for movement therethrough. Gas was added to the kiln in counter-current to the hematite, moving from the exit point of the kiln to the entry point, wherein the gas was about 50% methane and 50% nitrogen. The gas was added over a range of weights, from 0 kmol of methane up to about 25 kmol of methane. At this high end, the 25 kmol of methane is equivalent to 560,350 standard liters of methane, or 19,789 standard cubic feet, assuming an ideal gas.

Figure 15:
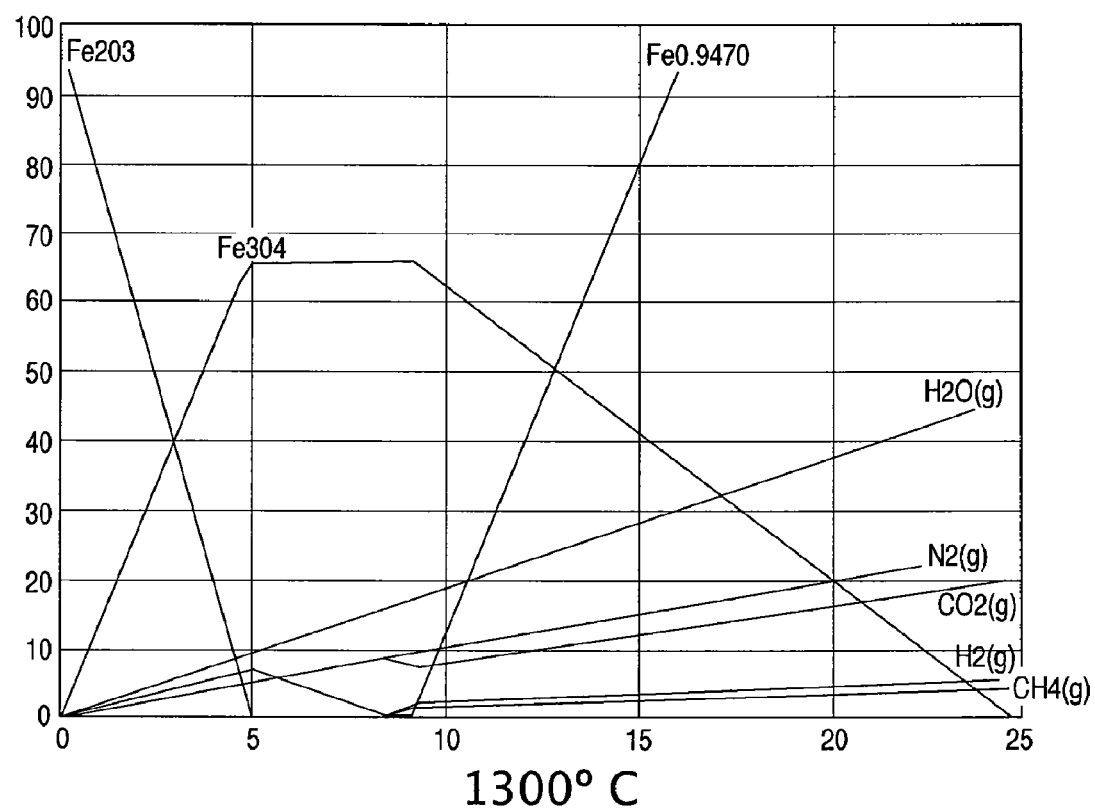
FIG. 15 is a graph showing the gas to solid ratio of methane to hematite in a reaction run at 1300° C.

As shown in FIG. 15, the full conversion of hematite to magnetite occurs at about 5 kmol of methane and lasts until about 9 kmol of methane are used, at which point wuestite (FeO), a contaminant, begins to be additionally formed.

For all of the above examples, when the proper amount of methane is used in relation to the amount of product, a high purity of magnetite is produced, typically above 98%.

Under the above, the reduction of hematite to magnetite to produce a substantially pure magnetite can occur with the greatest range of gas to solid ratio at about 700° C. However, the kinetics of the reaction at this temperature is often not sufficient enough for reduction to quickly occur. Kinetics become more favorable as temperature increases, and by the time 800° C. is reached, quick reduction of hematite is generally achieved. Thus, while the thermodynamically preferred temperature is above about 700° C., a more preferred kinetics preferred temperature for kinetics is above about 800° C.

As the maximum temperature increases, however, the ratio of gas to solid that produces pure magnetite is reduced. Further, when the temperatures increase above about 1200° C., the hematite loses stability quickly and forms magnetite at very low levels of gas. Operation at these high temperatures is generally uneconomical as energy costs are high and expensive special alloys may be required for the process equipment. Thus, while the preferred maximum temperature is about 1300° C., the more preferred maximum is 1200° C. Therefore, the preferred operational range of the invention is about 700 to 1300° C., and the more preferred range is between about 750 to 1200° C. However, to maximize the temperature range both favorable in kinetics and in the wide range of methane to hematite ratios allowed and to satisfy equipment issues, the most preferred temperature range is between about 800 to 900° C.

Nitrogen dilution has no effect on the ratio of methane to hematite needed or the purity of the methane yield. As shown in FIGS. 16 and 17, the method of the invention was theoretically conducted with methane diluted by 50% methane and 50% nitrogen (FIG. 16), and with 100% methane (FIG. 17). The results of the comparison are substantially similar, such that the effect of dilution can be dismissed as minimal. The effect of nitrogen has minimal effect on the thermodynamics of the invention.

Figure 18:
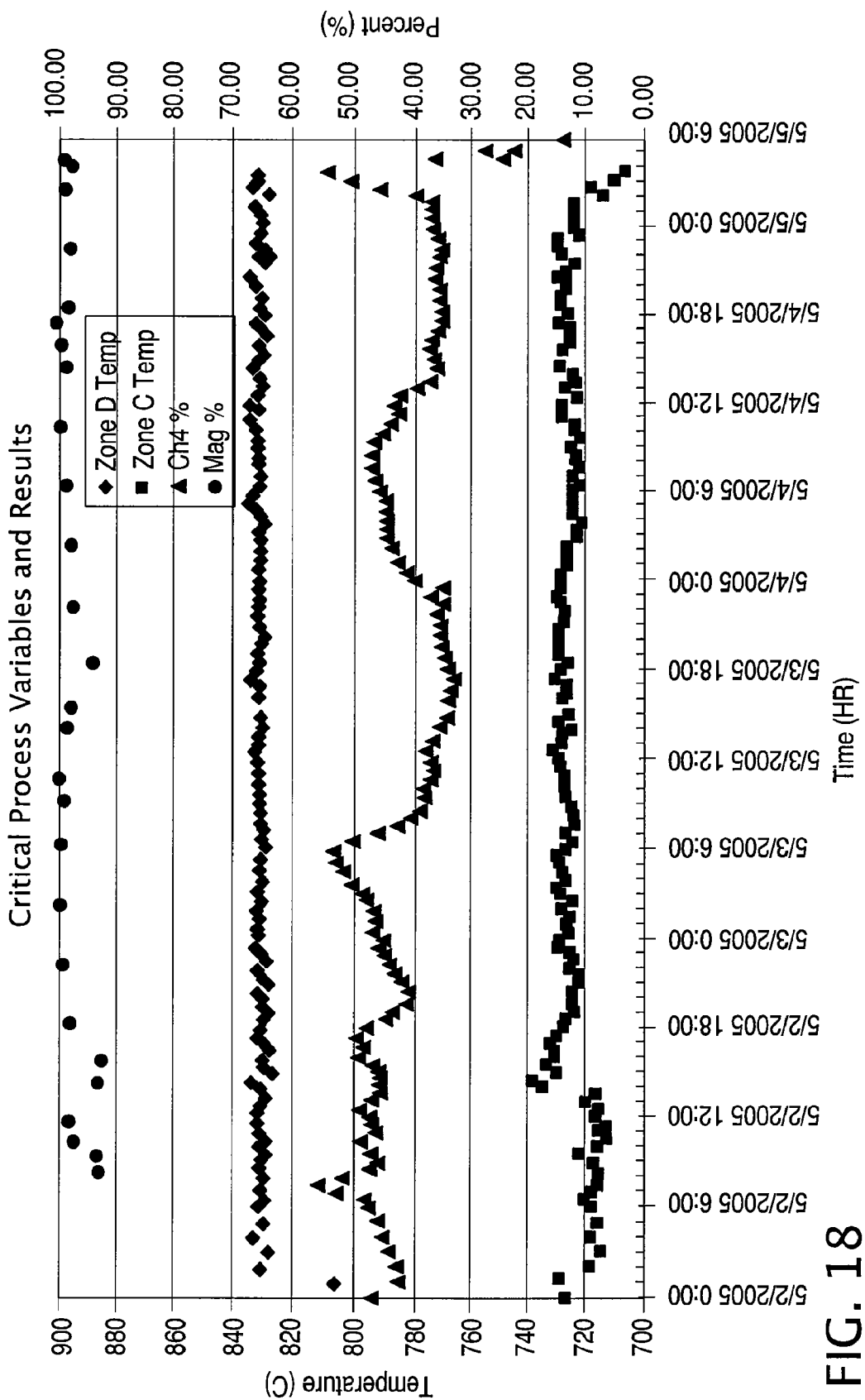
FIG. 18 is a graph showing the purity levels of magnetite in reactions run at 830° C.

As shown in FIG. 18, when temperature zone D ranges between about 820 and 840° C., under all listed conditions such as variable weight percents of methane, greater than 90% purity of magnetite is readily achievable. Further, under most conditions, greater than 98% purity of magnetite is readily achievable, up to 100% purity. As shown in FIG. 18, precursor temperature zone C is preferably below 740° C.

Figure 19:
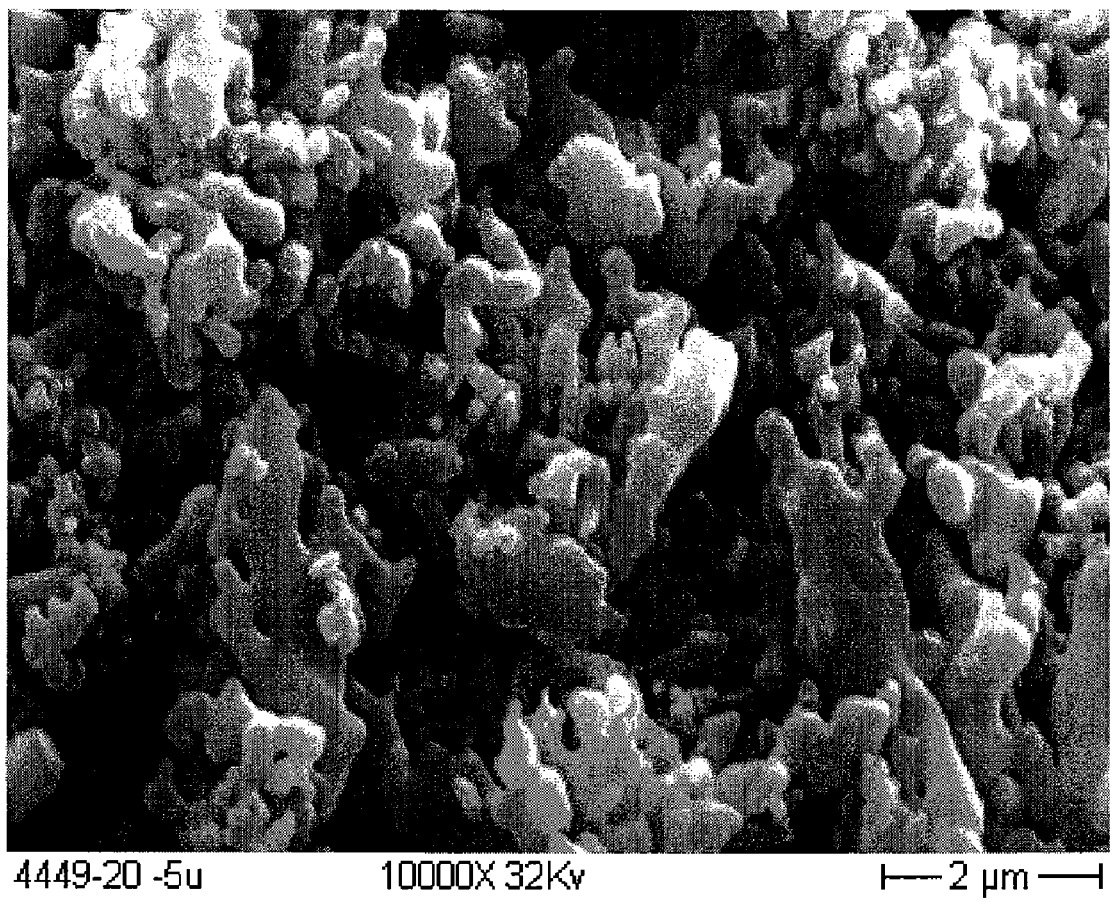
FIG. 19 is a photo-micrograph of high purity magnetite produced by the process of the invention.

The high purity magnetite produced by the invention, as shown in FIG. 19, was analyzed. The resultant magnetite was found to be less than 1 µM, generally between about 0.6 and 0.9 µM. with agglomerates of ~15 microns. The composition of the magnetite of a test run done at a maximum temperature of 830° C. is shown in Table 2.

TABLE 2

XRD Analysis of Magnetite Product

| Measured Component | % of Composition |
|---|---|
| $Fe_2O_3$ (Hematite) | 1.00 |
| $Fe_3O_4$ (Magnetite) | 98.25 |
| FeO (Wuestite) | 0.00 |
| Trace | 0.75 |

The trace contaminants were primarily carbon, sulfur, calcium, manganese, titanium, copper, silicon, aluminum, and chrome.

The tap density of the magnetite product, as measured, was 1.02 g/ml, and the bulk density was 0.76 g/ml, and the purity was greater than 98.25% magnetite. Further, magnetic saturation was 91.6 emu/g and magnetic remnance was 6.9 emu/g.

The magnetic saturation value is defined as the degree of magnetism where a further increase in magnetization force (driving field) produces no significant increase in the magnetic flux density of a specimen. In general, a magnetic saturation value greater than 90 emu/g indicates a very pure product. Magnetic remnance is defined as the measure of the remaining magnetization (or magnetic flux density) when the driving field is reduced to zero.

It will be appreciated that the present process and related apparatus provides an efficient, simple way to produce exceedingly high purity magnetite using novel maximum heating device temperatures and hematite reduction agents. It will be further appreciated that the high purity magnetite can be produced by comparing the ratio of pounds of hematite used with the standard cubic foot of methane reductant utilized. All this facilitates the creation of high purity magnetite not previously produced with this level of simplicity and on a commercial scale. It will further be appreciated that the heating device contains additional features that enable this process to proceed smoothly and with optimal precision.

While a full and complete description of the invention has been set forth in accordance with the dictates of the patent statutes, it should be understood that modifications can be resorted to without departing from the spirit hereof or the scope of the appended claims. For example, the shape of casing 32 can widely vary.

The invention claimed is:

1. An apparatus for converting powdered hematite into high purity magnetite, comprising:
   a heating device having a first end and a second end,
   a feed zone adjacent the first end of the heating device for feeding hematite into the heating device,
   a discharge zone adjacent the second end of the heating device for receiving the high purity magnetite,
   at least two temperature zones within the heating device,
   a multiplicity of heating elements for heating a first temperature zone having a first temperature and a second temperature zone having a second temperature, wherein the heating elements are structured to heat the second zone to a higher temperature than the first zone, the second zone starting and ending between about 15% of the distance from the first end of the heating device to the second end and the second end of the heating device, and
   a gas passage for conveying gas into the heating device.

2. The apparatus of claim 1, wherein the gas passage is located in the discharge zone for introducing gas for conveyance counter-current the hematite.

3. The apparatus of claim 1, wherein the gas passage is located in the feed zone for introducing gas for conveyance concurrent the hematite.

4. The apparatus of claim 1, wherein the heating device is an indirectly heated kiln.

5. The apparatus of claim 1, wherein the heating device has a rotatable interior tube which receives the hematite from the feed zone and contains the at least two temperature zones.

6. The apparatus of claim 1, wherein the heating device further contains a third temperature zone adjacent to the second temperature zone on an opposite side of the second temperature zone from the first temperature zone, the heating elements structured to heat the third temperature zone to a temperature less than the second temperature zone such that the second temperature zone is between two temperature zones of lesser temperature.

7. The apparatus of claim 6, wherein the heating device contains a fourth temperature zone adjacent the third temperature zone on an opposite side of the third temperature zone from the second temperature zone, the heating elements structured to heat the fourth temperature zone to a lower temperature than the third temperature zone.

8. The apparatus of claim 1, wherein the apparatus is structured to monitor the temperature of the at least two temperature zones.

9. The apparatus of claim 8, wherein the apparatus is structured to adjust the heating elements to adjust the temperature of at least two temperature zones.

10. The apparatus of claim 8, wherein thermocouples are structured to monitor the temperatures of the at least two temperature zones.

11. The apparatus of claim 1, further comprising output delivered to a computer operatively associated with the heating device for comparing measured temperature with stored desired temperatures and issuing a signal to a controller for receiving output signals from the computer and, when desired, adjusting the output of the heating elements responsive to the receiving output signals.

12. The apparatus of claim 5, wherein the feed zone includes a hematite feed tube and an auger tube containing a rotatable auger for delivering hematite from the feed tube to the rotatable interior tube.

13. The apparatus of claim 5, wherein the rotatable interior tube has an entry end and discharge end, the entry end being elevated with respect to the discharge end.

14. The apparatus of claim 13, wherein the entry end is elevated with respect to the discharge end by about 0.25 to 5.00 degrees.

* * * * *

UNITED STATES PATENT AND TRADEMARK OFFICE
CERTIFICATE OF CORRECTION

PATENT NO.        : 8,057,750 B2
APPLICATION NO.   : 12/696711
DATED             : November 15, 2011
INVENTOR(S)       : Dale L. Nickels et al.

It is certified that error appears in the above-identified patent and that said Letters Patent is hereby corrected as shown below:

Column 6, line 33, "third in highest" should read --third highest--.
Column 6, line 57, "zones" should read --zone--.
Column 6, line 59, "zones" should read --zone--.
Column 6, line 64, "zones" should read --zone--.
Column 6, line 65, "zones" should read --zone--.
Column 6, line 66, "zones" should read --zone--.
Column 6, line 67, "zones" should read --zone--.
Column 7, line 2, "zones" should read --zone--.
Column 7, line 3, "zones" should read --zone--.

Signed and Sealed this
Seventeenth Day of April, 2012

David J. Kappos
*Director of the United States Patent and Trademark Office*